Jan. 11, 1949.                J. W. ORENDORFF                2,458,795
                                 BEET TOPPER
Filed July 10, 1944                                       2 Sheets-Sheet 1
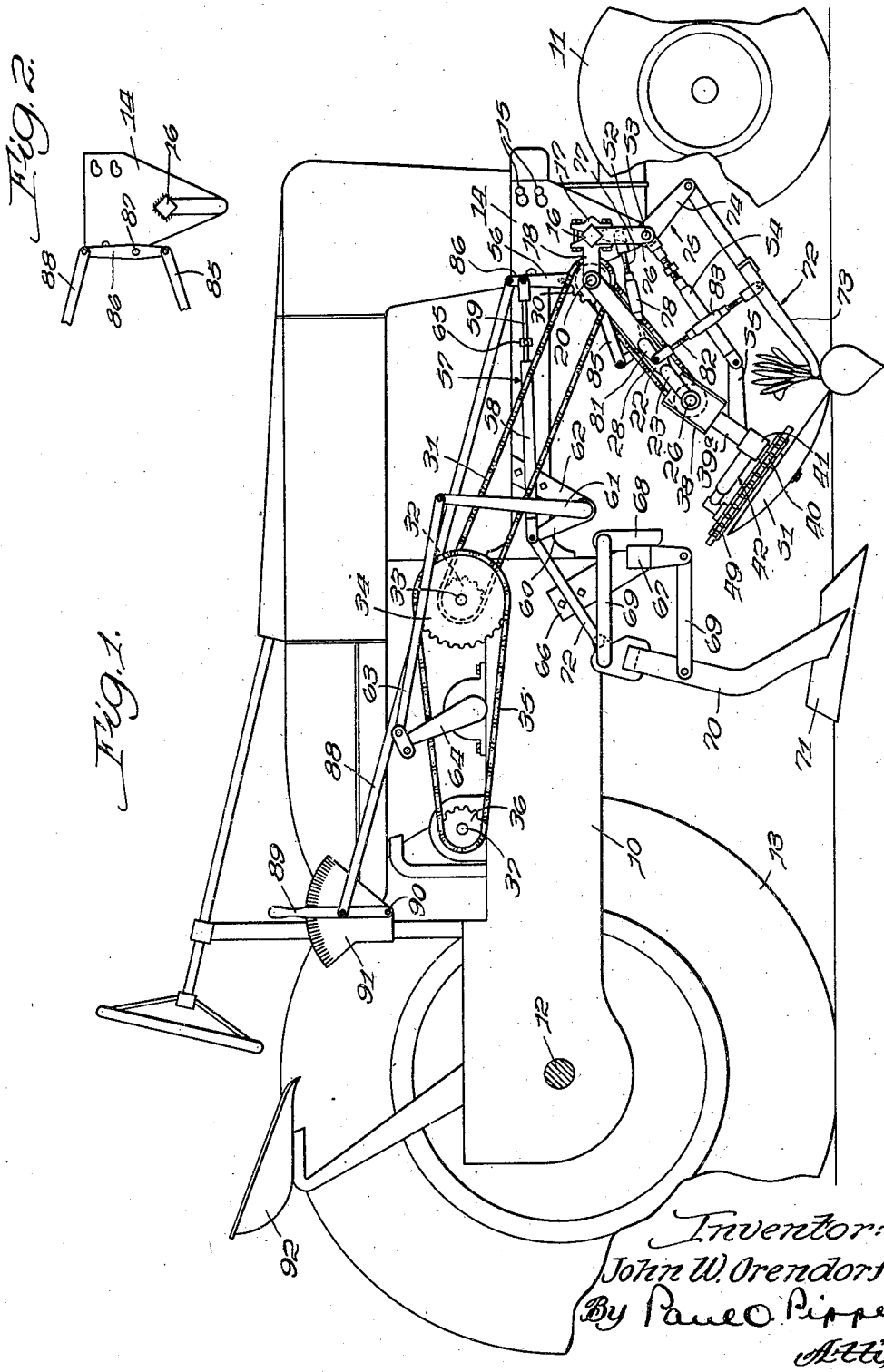
Inventor:
John W. Orendorff.
By Paul O. Pippel
   Atty.

Jan. 11, 1949.   J. W. ORENDORFF   2,458,795
BEET TOPPER

Filed July 10, 1944   2 Sheets-Sheet 2

Inventor:
John W. Orendorff.
By Paul O. Pippel
Atty.

Patented Jan. 11, 1949

2,458,795

UNITED STATES PATENT OFFICE 2,458,795

BEET TOPPER

John W. Orendorff, Canton, Ill., assignor to International Harvester Company, a corporation of New Jersey Application July 10, 1944, Serial No. 544,200

13 Claims. (Cl. 55—107)

1

This invention relates to agricultural implements and particularly to a topping mechanism for beets and the like.

An object of the invention is to provide an improved topping mechanism for beets and the like.

Another object is to provide improved means for mounting a beet-topping mechanism upon a tractor for floating movement with respect to the ground.

A further object is to provide in a beet topper adapted for floating movement, a cutting device for severing the beet tops and a gauge device adapted to move with the cutting device and at a different rate, whereby the amount of top removed from the beet may vary with the size thereof and the extent to which it projects above the ground.

Still another object is to provide in a beet topper a cutting element arranged to travel at an angle with respect to the ground, and means for causing the element to assume different angles with respect to the ground when severing the tops from beets of different sizes.

Other objects and advantages will become clear from the following detailed description when read in conjunction with the accompanying drawings, wherein:

Figure 1 is a view in side elevation of a tractor, showing a beet topper according to the present invention mounted thereupon;

Figure 2 is a detail showing the plate by which the topper is attached to the tractor;

Figure 3:
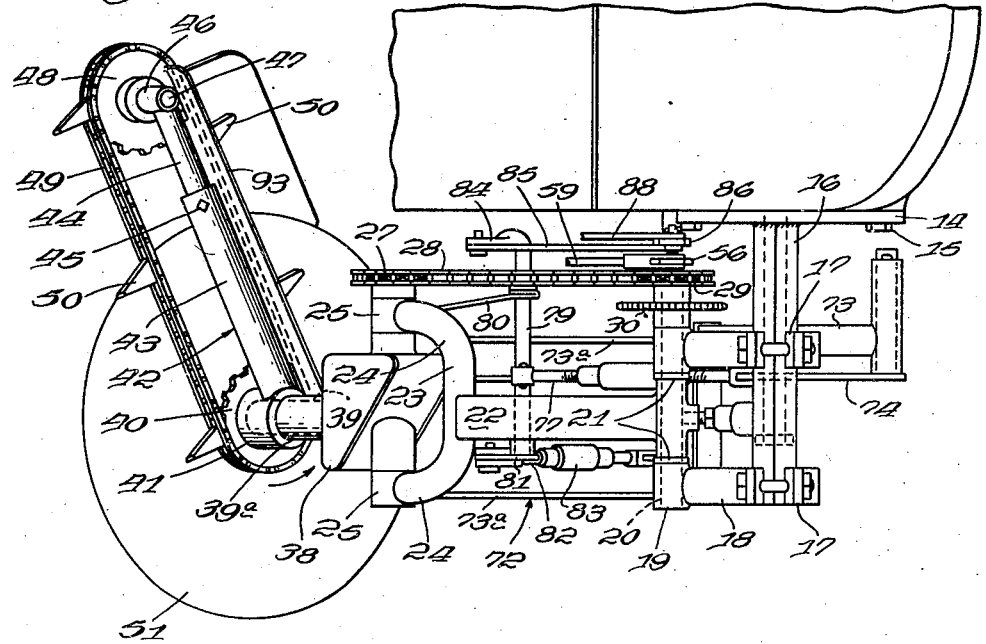
Figure 3 is a plan view on an enlarged scale of the topping mechanism shown in Figure 1.

Referring to the drawings, numeral 10 designates the longitudinally extending body of a tractor having front wheels 11, a rear axle 12, and rear wheels 13.

Adjacent the front of the tractor and at the side thereof is secured an attaching plate 14 having openings therein for the reception of cap screws 15 mounted on the tractor. Projecting laterally from plate 14 is a transverse tool-bar 16 of square cross-section, to which is clamped a pair of laterally spaced brackets 17 having rearwardly extending arms 18. The ends of arms 18 are provided with bearings 19 in which is journaled a transverse shaft 20 secured against axial displacement by collars 21.

Fast upon the shaft 20 is a rearwardly extending arm 22 to the rear end of which is secured,

2 as by welding, a yoke member 23 having legs 24, the ends of which are provided with bearings 25 in which is journaled a transverse shaft 26.

Mounted upon the inner end of shaft 26 is a sprocket wheel 27 connected by a drive chain 28 with a sprocket wheel 29 secured adjacent the inner end of shaft 20. Likewise mounted upon shaft 20 is a sprocket wheel 30 drivingly connected by a chain 31 with a sprocket wheel 32 keyed to a shaft 33 supported upon the tractor body 10. Likewise mounted upon shaft 33 is a larger sprocket wheel 34 connected by a chain 35 with a sprocket wheel 36 mounted upon shaft 37 driven from a suitable source not shown. Rotation of sprocket wheel 36 is thus transmitted through wheels 34, 32, and 30 to the sprocket wheel 27 on the end of shaft 26. Shaft 26 passes through a gear housing 38 containing suitable gearing, not shown, for transmitting drive from shaft 26 to a shaft 39, rotatable in a sleeve 39a, extending downwardly and rearwardly from the gear box 38. Gear box 38 is loose upon the shaft 26 and thus has pivotal movement with respect thereto. To the lower end of shaft 39 is keyed a sprocket wheel 40 and surrounding sleeve 39a is a collar 41. Extending rearwardly from collar 41 is a telescoping member 42 comprising a sleeve 43 and a shaft 44 secured in adjusted position by a set screw 45. The end of shaft 44 is provided with a boss 46 in which is rotatably mounted an upwardly extending stub shaft 47 upon the lower end of which is keyed a sprocket wheel 48. Around the wheels 40 and 48 is trained a chain 49 having projections 50 extending radially outwardly therefrom at intervals. Secured to the lower end of shaft 39 below the sprocket wheel 40 is a concavo-convex cutting disk 51.

The topping disk 51 is thus supported by the shaft 39 which is pivotable with respect to the shaft 26 supported by the yoke 23, which itself is pivotally mounted with respect to the tractor upon the transverse shaft 20, connected to toolbar 16 by brackets 17. Pivoting of shaft 39 upon shaft 26 is controlled through mechanism hereinafter to be described.

Welded to the lower portion of tool-bar 16 is a depending standard 52 apertured at its lower end to rotatably receive one end of a shaft 53, the other end of which is journaled in the plate 14. Pivoted upon shaft 53 is a rearwardly and downwardly extending link 54 adjustable in length and having its other end pivotally connected to a projection 55 secured to sleeve 39a surrounding shaft 39. Link 54 and arm 22 with its yoke 23 secured thereto thus constitute a nonparallel link arrangement which supports the topping disk 51. The topping disk 51 and the rotary shaft 39 are thus connected to the tractor for relative vertical movement by linkage comprising vertically spaced links converging rearwardly and movable about fixed pivots carried on the tractor. The rearward convergence of the links causes them to swing in different arcs about their pivots at 20 and 53, and causes shaft 39 to swing about its pivot at 26. Vertical movement of the topping unit to and from groundworking position is effected by a mechanism hereinafter to be described.

Upon the inner end of shaft 20 is mounted a vertically extending arm 56 to the upper end of which is pivoted a longitudinally extending connecting link 57 comprising a sleeve 58 and a telescoping shaft 59. The rear end of sleeve 58 is connected to an arm 60 secured to the inwardly bent lower end of an upstanding arm 61 rotatable in the lower portion of a bracket 62 bolted to the side of the tractor. Arm 61 is connected at its upper end by a rod 63 to a rock arm 64 mounted upon the tractor and rocked from a source of power not shown. On the shaft 59 is keyed a collar 65, and when arm 64 is rocked to raise the topping unit from the ground, the arms 61 and 60 are rocked and sleeve 58 abuts against collar 65, rocking arm 56 and raising the topping unit. In working position of the topping unit, the collar 65 is suitably spaced from sleeve 58 in order to provide for free floating movement of the topping unit to permit topping of beets of various sizes, as will hereinafter become clear.

Also secured to the side of the tractor is a plate 66 having projecting laterally from the lower end thereof a bar 67 having secured thereto a bracket 68 having upper and lower reaches for the pivotal mounting of rearwardly extending parallel links 69. To the rear ends of these links is secured a tool support 70 carrying at the lower end thereof digger blades 71. The upper end of the support 70 is connected by a link 72 with the arm 60 for movement therewith, so that upon raising of the topping unit to inoperative position, digger blades 71 are likewise raised from the ground.

Forming a part of the topper unit is a finder or gauge mechanism 72. This includes a finder arm 73, which extends downwardly and rearwardly in a generally parallel relation to the link 54 and is in the shape of a fork having tines 73a. Finder 73 is pivoted at its forward end upon the lower arm 74 of a bell-crank 75. Bell-crank 75 is mounted upon the shaft 53 and has an upwardly extending arm 76 upon which is pivoted one end of a link 77 adjustable in length by a turnbuckle 78. The other end of link 77 is connected to a transverse shaft 79, rotatably supported in the arm 22, and a strap 80 secured to the yoke 23. The outer end of shaft 79 is provided with a crank arm 81 to the end of which is pivotally attached a link 82 adjustable in length by a turnbuckle 83, and the lower end of which is connected to the gauge arm 73. The inner end of shaft 79 is provided with a crank arm 84 which is connected by a rod 85 with the lower end of a member 86 pivoted intermediate its ends at 87 upon the plate 14 (see Fig. 2). The upper end of member 86 is connected by a rod 88 to a lever 89 pivoted at 90 upon a quadrant 91 mounted upon the tractor and accessible from an operator's station 92.

By manipulating the lever 89, the rod 85 is moved forwardly and rearwardly, rocking shaft 79 and vertically moving link 82 supporting gauge arm 73. Relative spacing between disk 51 and gauge arm 73 is thus made adjustable.

Figure 4:
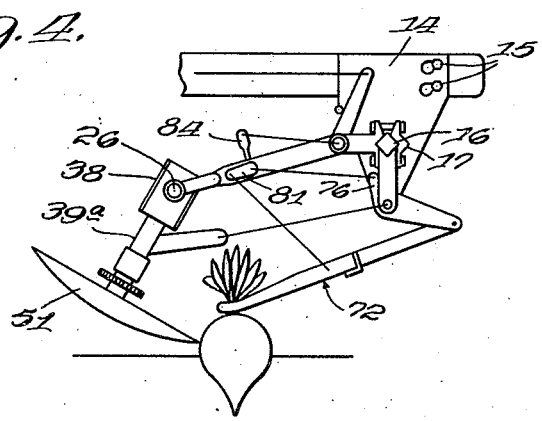
Figure 4 is a diagrammatic view showing the topping mechanism in a more elevated position than is shown in Figure 1.

As pointed out before, the topping unit has free vertical floating movement within certain limits. This is provided in order that the topping mechanism will rise and fall as beets of varying sizes are encountered. As shown in Figure 1, the topping disk is about to sever the top from a beet which projects only slightly above the ground. In this view, the gauge arm 73 is shown as resting upon the top of the beet, and the topping disk 51 as entering just below the crown thereof for the purpose of removing the foliage and that part of the beet top from which the foliage has sprouted. Likewise, in this position the shaft 39 and the topping disk 51 occupy certain angles with respect to the ground in order that the beet may be properly topped. However, when a larger beet is encountered having a greater proportion thereof extending above the surface of the ground, as indicated in Figure 4, the angle of shaft 39 increases, due to the difference in arcs described by links 22 and 54 about their pivots, and approaches more nearly to the vertical, while the angle of the disk 51 with respect to the ground decreases. Thus for larger beets the disk, as it rises, approaches a parallel relation with the ground. The reason for this is that the smaller the angle of the disk with respect to the ground, the less danger there is of splitting off the opposite side of the beet, as may frequently happen with conventional topping mechanisms.

It will also be observed that in Figure 4, the vertical and also the horizontal distance between gauge arm 73 and the cutting edge of disk 51 is greater than shown in Figure 1. This is necessary since on larger beets, foliage grows from a larger surface of the crown. Therefore, a thicker crown must be removed in order to properly top the beet. This differential movement between the gauge arm and the topping disk is due in part to the fact that the disk moves upwardly about the pivot of arm 22 upon the shaft 20, while gauge 73 moves upwardly about its pivot upon arm 74 of bell-crank 75. Gauge arm 73 is longer than links 22 and 54, and its point of contact with the beet top rises faster than the disk. As the gauge arm rises upon encountering a large beet it acts through links 82 to urge links 22 and 54 upwardly to raise the disk, rocking bell-crank 75 counter-clockwise to move the gauge pivot forwardly. Thus gauge arm 73 moves upwardly in a different arc and faster than the disk and the vertical distance therebetween increases. The increase in horizontal distance between the gauge arm and the disk upon encountering a larger beet is to accommodate the broader crown of the larger beet, and is due to the fact that swinging of bell-crank 75 causes forward horizontal movement of the gauge arm simultaneously with its vertical pivotal movement, increasing the horizontal distance between the disk and the gauge arm. Likewise, as the disk moves upwardly, the shaft 39 pivots about shaft 26 so that the disk swings forwardly with the increase in angle of the shaft 39 with respect to the ground. It will be noted in Figure 1 that link 54 occupies an angle with respect to the projecting member 55 attached to the sleeve 39a, while in Figure 4 these two elements are in alinement. Thus, due to the position of shafts 20 and 53, upon which arm 22 and link 54 are respectively pivoted, these members move in different arcs and shaft 39 is caused to swing in a horizontal plane.

As pointed out before, adjustment of the relative spacing between gauge 73 and disk 51 is made by manipulating the lever 89. Slight changes may be made by adjusting the links 54, 77, and 82.

Disk 51, as indicated by arrows in Figure 3, rotates in a counter-clockwise direction. Tops removed from the beets by the disk 51 are carried rearwardly by the projections 50 on chain 49. Direction is imparted to the beet tops by the provision of a baffle plate 93 secured to the sleeve 43.

Having now described the invention, it should be understood that modifications may be made therein without departing from the spirit of the invention or the scope of the appended claims.

What is claimed is:

1. In a beet topper, a traveling support, a cutting element carried by the support for severing the tops from the beets, and means pivotally connecting the element to the support for vertical movement, said connecting means including means for tilting the cutting element to decrease its angle of penetration during upward movement thereof.

2. In a beet topper, a traveling support, a rotary cutting element carried by the support for rotation in a plane at an angle to the ground, means on the support for rotating said element, and means connecting said element to said support for vertical floating movement with respect thereto, said connecting means including means for tilting said element to decrease its angle with respect to the ground during upward movement thereof.

3. In a beet topper, in combination, a support, linkage mounted on the support for swinging movement in a vertical plane, a cutting element carried by the linkage, gauge means for the cutting element, means connecting the gauge means to the support for vertical swinging movement with respect thereto including means serving as a bell-crank pivoted on the support, means pivoting the gauge means on one arm of the bell-crank, means pivotally connecting the other arm of the bell-crank to the linkage, and means connecting the gauge means to the linkage for movement therewith.

4. In a beet topper, in combination, a support, linkage mounted on the support for swinging movement in a vertical plane, a cutting element carried by the linkage, gauge means for the cutting element, means connecting the gauge means to the support for vertical swinging movement with respect thereto including means serving as a bell-crank pivoted on the support for swinging movement in a generally horizontal plane, means pivoting the gauge means on the lower arm of the bell-crank, means pivotally connecting the upper arm of the bell-crank to the linkage, and means connecting the gauge means to the linkage for movement therewith, whereby the gauge means moves vertically in a generally straight line.

5. In a topping mechanism for beets and the like, a support, linkage mounted on the support for swinging movement in a vertical plane, a cutting element carried by the linkage, a gauge arm for the cutting element, movable means pivotally connecting one end of the gauge arm to the support, means connecting the linkage to the gauge arm for vertical movement about its pivot on the support, and means responsive to movement of said linkage for simultaneously horizontally moving said movable means, whereby the free end of said gauge arm, instead of moving in an arcuate path about its pivot, will move in a substantially straight line.

6. In combination with a tractor having a longitudinally extending body, drive wheels and an operator's station, a topping mechanism for beets or the like comprising linkage pivoted on the tractor for movement in a vertical plane, a cutting element carried by the linkage, gauge means pivoted on the tractor, means connecting the gauge means to the linkage for movement therewith, lift means on the tractor controlled from the operator's station for raising and lowering said topping mechanism, and separate means on the tractor controlled from the operator's station for independently vertically adjusting said gauge means including means serving as a bell-crank pivoted on said linkage, means connecting an arm of the crank to said gauge means, and means connecting the other arm of said crank to said gauge control means.

7. In a topping mechanism for beets and the like, a traveling support, a downwardly and rearwardly extending member carrying a cutting element for severing the top of the beet, a rearwardly extending link connected to the member and pivoted at its forward end to the support for generally vertical swinging movement, and connecting means between the member and the support operative to tilt the member and thereby increase the angle thereof with respect to the ground upon upward movement thereof.

8. In a topping mechanism for beets and the like, a traveling support, a downwardly and rearwardly extending member carrying a cutting element at its lower end adapted to penetrate the beet at an angle for severing the top of the beet, a rearwardly extending link connected to the member and pivoted at its forward end to the support for generally vertical swinging movement, and connecting means between the member and the support operative to tilt the member and thereby decrease the angle of penetration of the cutting element upon upward movement thereof.

9. In a topping mechanism for beets and the like, a traveling support, a cutting blade for severing the tops of the beets arranged at an angle with respect to the ground, a rearwardly extending ling connected to the blade and pivoted at its forward end to the support for generally vertical swinging movement, a beet-engaging gauge arm pivoted at its forward end on the support for generally vertical swinging movement, connecting means between the link and the gauge arm for vertically moving the member in response to movement of the arm, connecting means between the member and the support operative to increase the angle of the member with respect to the ground upon upward movement thereof, and means responsive to vertical movement of the member for moving longitudinally the pivot of the gauge arm on the support.

10. In a topping mechanism for beets and the like, a traveling support, a cutting blade for severing the tops of the beets arranged at an angle with respect to the ground, a rearwardly extending link connected to the blade and pivoted at its forward end to the support for generally vertical swinging movement, a beet-engaging gauge arm pivoted at its forward end on the support for generally vertical swinging movement on a radius longer than that of said link, whereby the beet-engaging portion of said arm moves at a different rate from said member, connecting means between the link and the gauge arm for vertically moving the member in response to movement of the arm, connecting means between the member and the support operative to increase the angle of the member with respect to the ground upon upward movement thereof, and means responsive to vertical movement of the member for moving longitudinally the pivot of the gauge arm on the support.

11. In a topping mechanism for beets and the like, a traveling support, a downwardly and rearwardly extending member carrying a cutting element for severing the tops of the beets, vertically spaced links pivotally connected at their rear ends to the member and at their forward ends to the support for generally vertical swinging movement, said links converging rearwardly whereby the angle of the member with respect to the ground increases upon upward movement thereof, a beet-engaging gauge arm pivoted at its forward end on the support for generally vertical swinging movement on a radius longer than that of said links, whereby the beet-engaging portion of said arm moves at a different rate from said member, and connecting means between the links and the gauge for moving the member vertically in response to movement of the gauge arm.

12. In a topping mechanism for beets and the like, a traveling support, a downwardly extending member having a cutting blade at its lower end arranged at an angle with respect to the ground, vertically spaced links pivotally connected at their rear ends to the member and at their forward ends to the support for generally vertical swinging movement, a beet-engaging gauge arm pivoted at its forward end on the support and connected to the said links for generally vertical swinging movement therewith, and connecting means between said links and said arm operative upon upward movement of said links to move forwardly the pivot of the gauge arm on the support, whereby the horizontal distance between said blade and said arm is increased.

13. In a topping mechanism for beets and the like, a traveling support, a downwardly extending member having a cutting blade at its lower end arranged at an angle with respect to the ground, vertically spaced links pivotally connected at their rear ends to the member and at their forward ends to the support for generally vertical swinging movement, a beet-engaging gauge arm pivoted at its forward end on the support and connected to the said links for generally vertical swinging movement therewith, connecting means between said links and said arm operative upon upward movement of said links to move forwardly the pivot of the gauge arm on the support, whereby the horizontal distance between said blade and said arm is increased, said connecting means including a bell-crank, means pivoting the gauge arm to one arm of the bell-crank and means connecting the other arm of the bell-crank to said links.

JOHN W. ORENDORFF.

REFERENCES CITED

The following references are of record in the file of this patent:

UNITED STATES PATENTS

| Number | Name | Date |
|---|---|---|
| 1,462,486 | Devey | July 24, 1923 |
| 1,877,278 | Davis | Sept. 13, 1932 |
| 2,308,392 | Roepke | Jan. 12, 1943 |